Patented Mar. 20, 1934

1,951,784

UNITED STATES PATENT OFFICE 1,951,784

PROCESS OF PREPARING ESTERS

Heinrich Bertsch, Chemnitz, Germany, assignor to H. Th. Bohme Aktiengesellschaft, Chemnitz, Germany No Drawing. Application August 1, 1932, Serial No. 627,216. In Germany July 13, 1931

6 Claims. (Cl. 260—100)

This invention relates to agents for increasing the wetting, penetrating, foam forming, and dispersive properties of liquids and to processes for making the same. The invention is particularly concerned with the production of agents suitable for use in the textile, leather, and allied industries which are economical to produce and which may be effectively used in solutions containing hard water, acid, or metal salts. It is a feature of the invention that the agents in question include or consist primarily of sulphuric acid esters of glucosides.

It has heretofore been proposed to produce sulphuric acid esters from glucosides, and particularly such esters as have low aliphatic alcohol radicals, by first forming the glucoside and thereafter treating the latter with sulphuric acid. For example, the glucoside may be formed by heating a sugar with an alcohol in the presence of hydrochloric acid or by treating the alcohol with acetobromo-glucose, the sulphation of the glucoside being subsequently effected.

It is found, however, that the sulphuric acid esters of the glucosides may be produced in an extremely simple and economical manner by simultaneously effecting the formation of the glucoside and the sulphation. Thus in a single operation the sugar, for example glucose, and the alcohol are mixed with the sulphating agent, the resultant product being the desired sulphuric acid ester.

These mineral acid esters may be utilized either in their free state or in the form of their salts with alkalies, ammonia, or other organic bases as washing, dispersing, and foam forming agents. One of the important properties of these compounds is the complete electrolytic stability which renders them suitable for use in hard water, sea water, or in dye baths containing metal salts.

The following specific examples are given to illustrated the manner in which the process may be carried out.

Example 1

180 grams of grape sugar in powdered form are introduced into 1000 grams of sulphuric acid at 66° Bé. and at a temperature of 30°-35° C. The temperature is then reduced by external cooling to 15°-20° C. and 165 grams of lauric alcohol $C_{12}H_{26}O$ are added, the mixture being stirred for ½ hour. The mixture is then poured on ice and the resulting homogeneous clear solution is mixed with a sufficient quantity of butyl alcohol to effect separation of the acid water which may then be drawn off. The solution is then neutralized with sodium hydroxide of 38° Bé. and a pasty product is derived which can be obtained in anhydrous form by drying, preferably in an atomizing drier of the usual type.

In the foregoing example, other solvents than butyl alcohol may be used, for example pyridine or methylcyclohexanol. Furthermore, the step of separating out the acid water may be eliminated by neutralization of the entire mass, and a dry product may be obtained through evaporation from which the inorganic salt can be separated by treatment with organic solvents.

In the same manner the sulphuric acid esters of the glucosides can be produced with lower or higher aliphatic alcohols, with cyclo-aliphatic or aromatic alcohols, with phenols, or with the substitution products of these compounds, for example, the amino, chloro, or carboxyl derivatives.

Some further examples follow hereunder:

Example 2

100 grams of mannose in powdered form are introduced at 45° C. into 1000 grams of sulphuric acid and 170 grams undecenol are added slowly, the mixture being simultaneously stirred. The product is further treated as indicated in Example 1, using methylcyclohexanol instead of butyl alcohol.

Example 3

100 grams of starch are treated as indicated in Example 2, for mannose.

Example 4

100 grams of cane sugar in powdered form are introduced at 50° C. into 1000 grams of chlorosulphonic acid and 108 grams of benzyl alcohol are added while stirring continuously.

It will be appreciated that sulphating agents other than sulphuric acid and chlorosulphonic acid may be used.

The sulphuric acid esters which contain monohydroxy alcohol radicals with more than eight carbon atoms and their salts with alkalies, ammonia, or other organic bases are found to be particularly suitable. All of the aforementioned compounds can be used in the same manner and for the same purposes in the textile and allied industries as the sulphonates and sulphates of the free fatty alcohols. One of the important applications of these compounds is in the process of textile fibre refining, the sulphuric acid esters having no deleterious effect whatever on the most delicate of fibres.

Having thus described the invention, what is claimed as new and desired to be secured by Letters Patent is:—

1. A process of making sulphuric acid esters which comprises the step of simultaneously reacting an alcohol with a carbohydrate and a sulphating agent.

2. A process of making sulphuric acid esters which comprises the step of simultaneously reacting a monohydroxy aliphatic alcohol with a sugar and sulphuric acid.

3. In a process of making sulphuric acid esters, the steps which comprise introducing first a carbohydrate and then an alcohol into a sulphating agent.

4. A process of making sulphuric acid esters which comprises the steps of simultaneously reacting an alcohol with a carbohydrate and a sulphating agent, and neutralizing the reaction product.

5. A process of making sulphuric acid esters which comprises the steps of simultaneously reacting an alcohol with a carbohydrate and a sulphating agent, and adding to the reaction product thus formed an organic solvent to effect separation of the acid water, withdrawing the acid water thus separated, and neutralizing the remaining solution.

6. Synthetic glucosides of the general formula $$R.(C_nH_{2n-2}O_{n-1}).OSO_3H,$$

wherein "R" designates an alcohol radical, and the expression in the brackets designates a carbohydrate radical.

HEINRICH BERTSCH.